Figure 1:
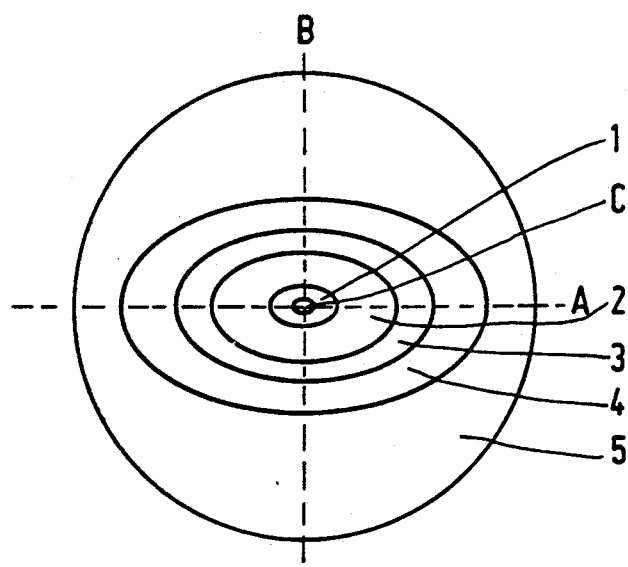

United States Patent [19]

Bachmann et al.

[11] Patent Number: 5,067,793

[45] Date of Patent: Nov. 26, 1991

[54] POLARIZATION-MAINTAINING SINGLE-MODE OPTICAL FIBRE AND METHOD OF MAKING SAME

[75] Inventors: Peter K. Bachmann, Aachen, Fed. Rep. of Germany; Giok D. Khoe, Eindhoven, Netherlands; Cathal J. Mahon, Copenhagen, Denmark; Hans-Jürgen Lydtin, Stolberg, Fed. Rep. of Germany

[73] Assignee: U.S. Philips Corp., New York, N.Y.

[21] Appl. No.: 565,824

[22] Filed: Aug. 10, 1990

[30] Foreign Application Priority Data

Aug. 16, 1989 [NL] Netherlands ................. 8902073

[51] Int. Cl.⁵ .................... G02B 6/22; C03C 25/02
[52] U.S. Cl. .................... 385/127; 385/11; 65/3.11; 65/3.12
[58] Field of Search ........... 350/96.29, 96.30, 96.31, 350/96.33, 96.34, 320; 65/3.11, 3.12, 2, 3.31

[56] References Cited

U.S. PATENT DOCUMENTS

| | | | |
|---|---|---|---|
| 4,149,772 | 4/1979 | Iyengar et al. | 350/96.33 |
| 4,179,189 | 12/1979 | Kaminow et al. | 350/96.33 |
| 4,274,854 | 6/1981 | Pleibel et al. | 65/2 |
| 4,415,230 | 11/1983 | Keck | 350/96.33 |
| 4,505,729 | 3/1985 | Matsumura et al. | 65/3.11 |
| 4,549,781 | 10/1985 | Bhagavatula et al. | 350/96.30 |
| 4,641,917 | 2/1987 | Glodis et al. | 350/96.33 |
| 4,669,814 | 6/1987 | Dyott | 350/96.29 X |
| 4,715,679 | 12/1987 | Bhagavatula | 350/96.33 |
| 4,896,942 | 1/1990 | Onstott et al. | 350/96.33 |
| 5,013,131 | 5/1991 | Fotheringham | 350/96.33 |

FOREIGN PATENT DOCUMENTS

| | | | |
|---|---|---|---|
| 59-15905 | 1/1984 | Japan | 350/96.33 X |
| 2116744 | 9/1983 | United Kingdom | 350/96.30 X |

OTHER PUBLICATIONS

Cohen et al., *Electronic Letters*, vol. 18, No. 24, pp. 1023 and 012411 (1982).

Primary Examiner—Brian Healy
Attorney, Agent, or Firm—William L. Botjer

[57] ABSTRACT

An optical fibre of the single-mode type in which light travels in one polarization mode is formed from a single-mode quadruple-clad fibre, in which the dimension of the light-transmitting part of the fibre in a first direction perpendicular to the axis of the fibre differs from the dimension of the light-transmitting part in a second direction perpendicular to the axis of the fibre and the first direction.

4 Claims, 1 Drawing Sheet

POLARIZATION-MAINTAINING SINGLE-MODE OPTICAL FIBRE AND METHOD OF MAKING SAME

BACKGROUND OF THE INVENTION

The invention relates to an optical fibre of the single-mode type, in which light travels in one polarisation mode (single polarisation mode) and to a method of manufacturing such a fibre. The invention relates more particularly to an optical fibre in which one polarisation mode of the light launched into the fibres is transported and the other polarisation mode is attenuated.

It is an object of the invention to manufacture such a fibre in a simple manner without using birefringence obtained by stress introduced into the fibre.

SUMMARY OF THE INVENTION

According to the invention, this object is achieved by an optical fibre comprising a core and at least one cladding having a smaller refractive index than the core, characterized in that the fibre comprises at least four claddings which surround the core and which, viewed from the core outwards, have alternately a smaller refractive index than the core and a larger refractive index than the adjoining claddings, yet smaller than that of the core, and in that the dimension of at least the light-transmitting part of the fibre in a first direction perpendicular to the axis of the fibre differs from the dimension of the light-transmitting part in a second direction perpendicular to the axis of the fibre and the first direction.

The invention is based on the discovery that an optical fibre of the so-called single-mode quadruple-clad type having a minimal dispersion over a wide wavelength range, becomes impervious to a part of the light in this wavelength range when the overall fibre diameter is reduced.

The invention is further based on the discovery that this effect also occurs when the diameter of such a single-mode quadruple-clad fibre is reduced only in one direction perpendicular to the fibre axis.

As far as could be ascertained by the Applicant, single-mode fibres of the quadruple-clad type having minimal dispersion over a wide wavelength range were described for the first time by Cohen and Mammel in Electronics Letters, Nov. 25, 1982, Vol. 18, No. 24, pages 1023 and 1024 in an article entitled: "Low-Loss Quadruple Clad Single Mode Light Guides with Dispersion below 2 ps/km nm over the 1.28 μm–1.65 μm Wavelength Range".

In accordance with the said publication and the published British Patent Application GB 2116744, a single-mode fibre having at least four claddings and a minimal dispersion in the wavelength range for which the fibre is designed can be described as follows.

The fibre comprises a core having a refractive index $n_c$ and a radius $R_c$, around which coree there are provided at least four cladding layers, the refractive indices and radii of which are designated as, $(n_1, R_1)$, $(n_2, R_2)$, $(n_3, R_3)$, $(n_4, R_4)$ respectively, and wherein $$n_c > n_2 > n_4 > n_3 > n_1 \text{ and}$$

$$R_4 > R_3 > R_2 > R_1 > R_c.$$

An optical fibre of said type comprises a light conducting core and a light-conducting ring formed by the second cladding. Said light-conducting ring conducts the light which leaks from the core through the first cladding. The core and the first cladding can be dimensioned such that, in particular, the dispersion is minimised, the second, third and fourth cladding can be dimensioned such that, in particular, the losses at large wavelengths are minimised.

By a suitable choice of the parameters, such a fibre can be designed in such a manner that, for example, in the wavelength range from 1.3 μm to 1.6 μm the light is transported with a minimal dispersion and low losses. In the art, such a fibre is also termed single-mode dispersion flattened type fibre.

Using a terminology similar to that in the said British Patent Application, an optical fibre in accordance with the present invention can be described as follows. The fibre comprises a core having a refractive index $n_c$ and an elliptical cross-section having a major axis $2a_c$ and a minor axis $2b_c$, where $a_c > b_c$, which core is surrounded by at least four cladding layers having a correspondingly shaped cross-section and refractive indices $n_1$, $n_2$, $n_3$ and $n_4$ and axes $(2a_1, 2b_1)$, $(2a_2, 2b_2)$, $(2a_3, 2b_3)$, $(2a_4, 2b_4)$, where it holds for each pair of axes $(2a_n, 2b_n)$ that $a_n > b_n$ and where:

$$n_c > n_2 > n_4 > n_3 > n_1,$$

$$a_4 > a_3 > a_2 > a_1 > a_c \text{ and}$$

$$b_4 > b_3 > b_2 > b_1 > b_c.$$

An elliptical cross-section is to be understood to mean a cross-section which is obtained when a cylindrical body is compressed in a direction perpendicular to the axis and stretched in a direction perpendicular to the axis and the direction of compression.

By a suitable choide of the ratio between the axes $a_n$ and $b_n$ it can be achieved that the wavelength range which is passed in the a-direction with a minimal dispersion and low losses differs from the wavelength range which is passed in the b-direction with a minimal dispersion and low losses.

For example, in one direction the fibre may be suitable for passing light with a minimal dispersion and low losses up to, for example, 1700 nm and in the other direction up to to 1500 nm. As regards the light in the wavelength range between 1500 and 1700 nm it was found that only one polarisation mode is mainly transported and the other polarisation mode is effectively attenuated.

BRIEF DESCRIPTION OF THE INVENTION

Figure 2:
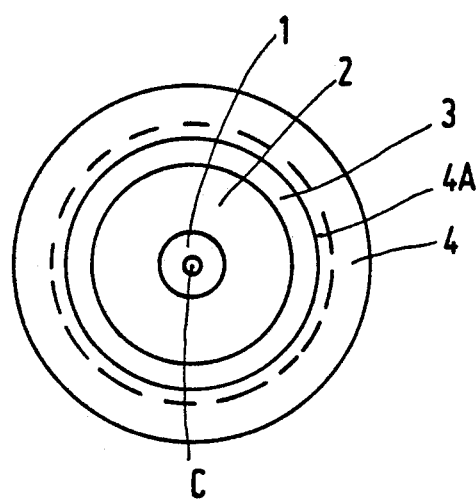
Figure 3:
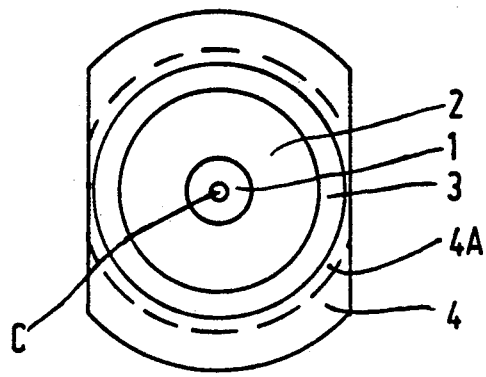

The invention and more particularly also a method of manufacturing an optical fibre according to the invention will be explained in more detail by means of an exemplary embodiment and with reference to the accompanying drawing, in which FIGS. 1 to 3 are cross-sectional views of an optical fibre during a number of steps in the manufacture thereof.

BRIEF DESCRIPTION OF THE PREFERRED EMBODIMENTS

FIG. 1 is a cross-sectional view of an optical fibre according to the invention, having a core c and a number of claddings 1 up to and including 5, the core c and the claddings 1 up to and including 4 having an elliptical cross-section. By means of dotted lines, a coordinate system (A, B) is indicated in the drawing. The axes $a_c$ and $b_c$ and $a_n$ and $b_n$, n having a value of 1 to 4, coincide with the axes A and B, respectively. The Figure shows that the core and the four cladding layers 1 up to and including 4 have an elliptical cross-section. The assembly is surrounded by a cladding 5 of variable thickness, in such a manner that the fibre has a circular external cross-section. In principle, however, this is not necessary for the operation of the fibre. The fibre cross-section shown in FIG. 1 is obtained when the method according to the invention is used.

FIG. 2 is a cross-sectional view of a solid preform for drawing a fibre according to the invention. Such a preform can be obtained as follows.

On the inside of a tube 4 of quartz glass, manufactured from quartz crystals or synthetically, first a layer of synthetic quartz glass 4A is deposited, followed by a layer 3 of doped quartz glass having a smaller refractive index than quartz glass, of for example fluorine-doped quartz glass. Subsequently, a layer 2 of doped quartz glass, for example quartz glass doped with germanium oxide, having a larger refractive index than quartz glass is deposited. On said layer 2 there is deposited a layer 1 of doped quartz glass, for example doped with fluorine just like layer 3, having a smaller refractive index than quartz glass. Subsequently, a layer of core material c having a larger refractive index than quartz glass is provided, said layer, just like layer 2, consisting of, for example, quartz glass doped with germanium oxide. The quantity of dopant in the various layers and the thickness of the deposited layers are governed by the refractive index and the relative large thicknesses which are to be obtained in, respectively, the ultimate preform and optical fibre and which are determined by the wavelength range in which a minimal dispersion and low losses are to be obtained. The manner in which this choice can be made is known to those skilled in the art and described in the above-mentioned literature to which explicit reference is made in this connection, see for example the above mentioned British Patent Application GB 2116744. The tube of quartz glass is subsequently collapsed into a solid preform, a preform having a cross-section as shown in FIG. 2 being obtained.

In a subsequent stage parts of the preform are ground away parallel to the axis. The part to be ground away is preferably limited to the material 4 and possibly 4A, see FIG. 3. The faces formed extend parallel and symmetrically relative to the axis of the preform. They are tangent or just not tangent to the cladding 3.

The body obtained is subsequently placed in a quartz tube and drawn in the customary manner, thus forming a fibre having a cross-section as shown in FIG. 1. The fibre has a round external cross-section, the core and the claddings obtained by deposition from the gas phase have elliptical cross-sections.

The optical fibre according to the invention has a number of advantages relating to both its manufacture and its operation. No complicated doping schemes have to be followed and/or no additional elements have to be used in the fibre and/or no special manufacturing steps have to be carried out, as is often the case with fibres in which birefringence is obtained by stresses introduced into the fibre. During the operation of the fibre the original polarisation mode is maintained. If the desired polarisation mode is locally disturbed in the fibre this is corrected by the fibre itself in that the undesirable polarisation mode is attenuated over the entire length of the fibre.

We claim:

1. A single-polarisation mode optical fibre comprising at least a core and at least one cladding having a smaller refractive index than the core, characterized in that the fibre comprises at least four claddings which surround the core and which, viewed from the core outwards, have alternately a smaller refractive index than the core and a larger refractive index than the adjoining claddings, yet smaller than that of the core, and in that the dimension of at least the light-transmitting part of the fibre in a first direction perpendicular to the axis of the fibre differs from the dimension of the light-transmitting part in a second direction perpendicular to the axis of the fibre and the first direction.

2. An optical fibre as claimed in claim 1, characterized in that the fibre comprises a core having an elliptical cross-section with a refractive index $n_c$ and a major axis $2a_c$ and a minor axis $2b_c$, where $a_c > b_c$, which core is surrounded by at least four cladding layers having correspondingly shaped cross-sections and refractive indices $n_1$, $n_2$, $n_3$ and $n_4$ and axes $(2a_1, 2b_1)$, $(2a_2, 2b_2)$, $(2a_3, 2b_3)$, $(2a_4, 2b_4)$, where it holds for each pair of axes $(2a_n, 2b_n)$ that $a_n > b_n$ and where:

$n_c > n_2 > n_4 > n_3 > n_1$, $a_4 > a_3 > a_2 > a_1 > a_c$ and $b_4 > b_3 > b_2 > b_1 > b_c$.

3. A method of manufacturing a single polarisation mode optical fibre characterized in that in a first step a solid preform for a fibre, comprising a core and at least four claddings is manufactured in a customary manner by successively depositing cladding material and core material on the inside of a tube of quartz glass having a circular internal cross-section, and subsequently collapsing the assembly into a solid preform, after which said preform is provided with two mutually parallel faces which extend parallel and symmetrically to the axis of the tube, after which in a next step the preform is drawn into a fibre.

4. A method as claimed in claim 3, characterized in that glass is removed from the preform so that the faces formed are substantially tangent to the third cladding.

* * * * *